United States Patent [19]

Sutor

[11] Patent Number: 5,190,899
[45] Date of Patent: Mar. 2, 1993

[54] HIGH ALUMINA REFRACTORY SHAPES

[75] Inventor: Peter T. Sutor, Pittsburgh, Pa.

[73] Assignee: Dresser Industries, Inc., Dallas, Tex.

[21] Appl. No.: 844,962

[22] Filed: Feb. 28, 1992

Related U.S. Application Data

[63] Continuation of Ser. No. 281,885, Dec. 7, 1988, abandoned, which is a continuation of Ser. No. 84,308, Aug. 11, 1987, abandoned.

[51] Int. Cl.$^5$ ............................................. C04B 35/10
[52] U.S. Cl. .................................... 501/127; 501/153
[58] Field of Search ................................ 501/127, 153

[56] References Cited

U.S. PATENT DOCUMENTS 3,582,372  6/1971  Criss et al. ......................... 501/127
4,334,029  6/1982  Naito et al. ......................... 501/109

Primary Examiner—Mark L. Bell
Assistant Examiner—Anthony J. Green

[57] ABSTRACT

A mix and a high alumina refractory shape with high resistance to aluminum penetration comprising aluminum oxide and at least about 1% by weight of boron phosphate.

9 Claims, No Drawings

HIGH ALUMINA REFRACTORY SHAPES

This application is a continuation of application Ser. No. 281,885 filed Dec. 7, 1988, which in turn is a continuation of application Ser. No. 084,308 filed Aug. 11, 1987, now abandoned.

BACKGROUND OF THE INVENTION

The present invention relates to high alumina refractory shapes and in particular bricks that are utilized primarily for aluminum furnaces.

At the present time, such refractory shapes, and particularly the bricks, show a susceptibility to penetration by the aluminum in the furnace. As a consequence, the refractory undergoes alteration and is ultimately consumed due, in part, to the penetration of the aluminum into the brick. Various efforts have been made to find suitable additives in order to improve the penetration resistance of high alumina bricks but these approaches have had limited success due to the undesired lowering of the hot strength of the refractory shape or brick or on the processing characteristics.

Such efforts have included; as in U.S. Pat. No. 4,088,502, the use of zinc borosilicate frit as a penetration inhibitor or in the case of U.S. Pat. No. 4,126,474 the use of barium sulfate. However, it has been found that addition of zinc borosilicate frit when used in combination with phosphoric acid which is utilized for maximum strength causes a severe degree of sticking to the press used in forming the shape of the brick to the point where it is not possible to get satisfactory brick in order to utilize them in aluminum furnaces. Addition of BaSo4 lowers the hot strength.

SUMMARY OF THE INVENTION

The present invention results in a novel, high alumina refractory shape with improved penetration resistance and without any loss of hot strength or negative effects during processing to form the shape.

Briefly, the present invention comprises mixes and high alumina refractory shapes with high resistance to aluminum penetration made from a mix comprising aluminum oxide and at least about 1% by weight of boron phosphate.

Most particularly, the present invention relates to mixes for and low temperature cured high alumina refractory bricks having the aluminum oxide and boron phosphate portions noted above and a binder.

DETAILED DESCRIPTION

The present invention is based upon the unexpected results involving the use of boron phosphate as an aluminum penetration inhibitor in high alumina refractory shapes. While it is suitable for a wide variety of shapes, it will be discussed in connection with bricks, particularly those utilized in aluminum furnaces.

The addition of the boron phosphate can be made to any of the high alumina bricks now conventionally utilized for forming bricks for aluminum furnaces. Basically, these compositions are primarily formed of a calcined bauxite as the source of the aluminum oxide, although additional aluminum oxide in the form of alumina can also be added to the composition.

Other ingredients that can be included in these bricks for their usual effect are ball clays, kaolin clays, and volatilized silica as plasticizers and other conventional additives. These are added in their usual amounts.

It is also usual to have as a plus addition to the mix of water in order to wet the mix and provide lubrication during the high pressure forming.

A preferred plus addition is a binder such as a monoaluminum phosphate solution or phosphoric acid. These act both to bind the mix and provide the wetting and lubrication required during high pressure forming. It is preferred to add about 4% to 5% by weight $P_2O_5$, based on each 100 parts by weight of the mix. The phosphoric acid forms a chemical bond by reacting with the alumina powder to form aluminum phosphate at 500°–600° F.

While water alone can be utilized, it is not as desirable for purposes of the brick strength to utilize the same. It is of course possible to add water together with the phosphoric acid and it is used to form the monoaluminum phosphate solution if no phosphoric acid is used. The brick must be fired to above about 2000° F. to form a ceramic bond.

The main ingredient of the brick is the aluminum oxide and preferably this is used either in the form of an aluminum oxide based grain or powder such as bauxite alone (which contains 85%–90% aluminum oxide) or a mixture of bauxite with more pure alumina powder. For purposes of economy and function it is preferred to use a mixture of the two with preferably at least about 75 parts of the bauxite and 15 parts of alumina.

As to proportions, it has been found that the mix should contain for best performance in an aluminum furnace at least about 60% by weight; and preferably about 80% by weight, of aluminum oxide, preferably as noted in the form of a mixture of calcined bauxite and alumina, and at from about 1% to 5% by weight of the total weight of the mix of boron phosphate.

It has been found that it is preferred for purposes of best resistance to aluminum penetration, as well as for best processing characteristics, to use a concentration of about 2.5% to 3.6% by weight of the boron phosphate in combination with phosphoric acid. It has been noted that in some instances at levels at about 5% that the processing characteristics of the brick are adversely affected and that there is on some occasions difficulty in controlling the pressing process and sticking of the mix to the press pads occurs.

At levels below about 1% by weight there is, of course, not the degree of improved resistance to aluminum penetration desired.

As in forming any brick, it is preferred to use a blend of different mesh sizes and this will vary depending upon the characteristics desired and is not critical in terms of getting improved resistance to aluminum penetration. The mesh blend of particles can be any conventionally used such as mixtures of $-5 + 10$ mesh, $-10 + 38$ mesh, $-38$ mesh, and ball mill fines. The bulk of the particles should be in the $-10$ to $+38$ mesh size.

When the phosphoric acid is added the brick can be cured at low temperatures; about 600° F., and have substantially the same strength as brick fired at temperatures of 2000° F., as is required when no phosphoric acid is used.

The invention will be further described in connection with the following examples which are set forth for purposes of illustration only.

EXAMPLES 1 TO 7

A series of seven different bricks were made in a laboratory using a calcined bauxite, alumina, ball clay, and different penetration inhibitors. As plus additions to form the brick either water, phosphoric acid, or a monoaluminum phosphate solution was utilized. As a control, Example 1 did not contain any penetration inhibitor.

The resultant bricks were tested for their processing characteristics, hot strength, and resistance to aluminum penetration. The aluminum resistance was determined by the standard Alcoa 72 hr. cup test, 7075 Alloy.

The results are set forth in Table I below.

without the calcium borate can be stored in hoppers at the facility for days and still get good density.

Approximately 1200 brick formed of the mix were pressed. The cured brick averaged a bulk density of 174 pcf and 19.4% porosity compared to 181 pcf and 15.3% in the lab. Despite the low density, service trials were contemplated, but all 12 of the cured brick sampled at the facility showed severe internal cracking. None of the brick was shipped for service trials.

TABLE I

| | EXAMPLE | | | | | | |
|---|---|---|---|---|---|---|---|
| | 1 | 2 | 3 | 4 | 5 | 6 | 7 |
| Mix: | | | | | | | |
| Calcined Bauxite | | | | | | | |
| 5/10 mesh | | | | 14.1% | | | |
| 10/38 mesh | | | | 38.8 | | | |
| −38 mesh | | | | 17.1 | | | |
| Ball Mill Fines | 10.0 | 5.0 | 5.0 | 5.0 | 4.0 | 5.0 | 7.0 |
| Alumina (−325 mesh) | | | | 15.0 | | | |
| Ball Clay | | | | 5.0 | | | |
| Boron Phosphate | — | 5.0 | 5.0 | 5.0 | — | — | — |
| Zinc borosilicate frit | — | — | — | — | 3.0 | — | — |
| Barite, 200 mesh | — | — | — | — | 3.0 | 5.0 | — |
| Calcium Borate concentrate | — | — | — | — | — | — | 3.0 |
| Plus Additions: | | | | | | | |
| 75% Phosphoric Acid | 7.5 | 7.5 | — | — | 6.7 | 7.0 | 6.5 |
| Monoaluminum Phosphate Soln. | — | — | 5.7 | — | — | — | — |
| Water | — | — | — | 4.2 | — | — | — |
| Forming Pressure, psi: | | | | 8000 | | | |
| Green Bulk Density pcf: | 186 | 186 | 182 | 181 | 188 | 190 | 187 |
| Degree of Sticking at Press: | slight | slight–moderate | severe | slight–moderate | severe | slight | slight |
| Heat Treatment: | | | | 600° F. | | | |
| Bulk Density, pcf: | 180 | 178 | 176 | 172 | 182 | 183 | 181 |
| % Apparent Porosity: | 16.8 | 16.8 | — | 21.2 | — | 16.3 | 15.3 |
| Apparent Specific Gravity: | 3.47 | 3.42 | — | 3.50 | — | 3.50 | 3.42 |
| Modulus of Rupture, psi | | | | | | | |
| Room Temperature: | 2520 | 2840 | — | 1040 | — | 2380 | 1880 |
| At 2000° F.: | 3290 | 2200 | — | 1750 | — | 1280 | 1980 |
| Alcoa 72 hr cup test, 7075 Alloy | | | | | | | |
| % Change in Metal Chemistry | | | | | | | |
| Silicon (Si): | +0.35 | +0.09 | — | +0.01 | — | +0.04 | +0.08 |
| Iron (Fe): | +0.06 | +0.02 | — | +0.02 | — | +0.01 | +0.01 |
| Magnesium (Mg): | −1.73 | −1.75 | — | −1.27 | — | −1.46 | −1.42 |
| Depth of Metal Penetration | variable up to 2 mm | none | — | none | — | trace | none |
| Degree of Metal Adherenece: | strong | weak | — | moderate | — | strong | moderate |
| 2550° F. Reheat | | | | | | | |
| % Linear Change: | — | +1.3 | — | — | — | — | +1.1 |
| % Volume Change: | — | +5.2 | — | — | — | — | +3.0 |

The mixes of Examples 3 and 5 stuck badly to the brick press pads and could not be further processed. The mix of Example 5, in fact reacted and dried out shortly after mixing.

EXAMPLE 8

The identical mix of Example 7 was subjected to a field trial under commercial production conditions at a manufacturing facility.

A total of six 3000-pound batches were made. Three were mixed in the DE-22 Eirich mixer and three in a Simpson mixer. Various acid and water combinations and mixing times were evaluated. The overwhelming problem with all batches was rapid drying out in the hopper, which caused poor density and pressure cracking (internal cracks). Batches made in the Simpson mixer with no water had the longest shelf life, approximately one hour, but much longer hopper storage life is required for commercial production.

The calcium borate was reacting and causing the mix to dry out. The rapid drying out was not observed in the laboratory test. However, green density after 3 days storage did show a drop of 8 pcf. The same mix, but

EXAMPLE 9

A mix utilizing boron phosphate as the penetration inhibitor formed into brick and tested. The mix was as follows:

| Calcined Bauxite | |
|---|---|
| −3 + 10 mesh | 16.3 |
| −10 + 28 mesh | 32.6 |
| −28 + 65 mesh | 12.1 |
| −65 mesh | 11.0 |
| Ball Mill Fines | 3.0 |
| Alumina (−325 mesh) | 15.0 |
| Ball Clay | 5.0 |
| Boron phosphate | 5.0 |
| Plus addition: | |
| Phosphoric Acid (75%) | 6.0 |

The batch was made in an Eirich R7 mixer and pressed after storing for 50 minutes, 3 to 3½ hours, 5½ to 6 hours, and 24 hours.

The batch temperatures, bulk density of the brick and its strength as well as other test results are set forth in Table II below:

TABLE II

| | |
|---|---|
| Batch Temperature, °F. As Made | 110 |
| After 50 Minutes Storage: | 115 |
| After 3-3¼ Hours Storage: | 112 |
| After 5½-6 Hours Storage: | 109 |
| After 24 Hours Storage: | 110 |
| Forming Method: | 9" straights pressed at 8,000 psi after storage at 110° F. |
| Heat Treatment: | Cured at 600° F. |
| Bulk Density of Cured Brick, pcf (Av 2) | |
| After 50 Minutes Storage: | 180 |
| After 3-3¼ Hours Storage: | 179 |
| After 5½-6 Hours Storage: | 179 |
| After 24 Hours Storage: | 178 |
| Length of Cured Brick, in inches (Av 2) | |
| After 50 Minutes Storage: | 9.02 |
| After 3-3¼ Hours Storage: | 9.02 |
| After 5½-6 Hours Storage: | 9.02 |
| After 24 Hours Storage: | 9.02 |
| Modulus or Rupture, psi (Av 2) | |
| After 50 Minutes Storage: | 2590 |
| After 3-3¼ Hours Storage: | 2700 |
| After 5½-6 Hours Storage: | 2670 |
| After 24 Hours Storage: | 2520 |

EXAMPLES 10 AND 11

The mix of Example 1 was utilized in two tests except that one mix (Example 10) contained 1% by weight of boron phosphate and the second mix (Example 11) contained 2.5% by weight of Boron phosphate.

The mixes are formed into brick as in Examples 1 to 7 and cured at 600° F. The bricks were tested and the results are set forth in Table III below.

TABLE III

| | EXAMPLE | |
|---|---|---|
| | 10 | 11 |
| Forming Method: | 9" Straights Pressed at 8000 psi | |
| Green Bulk Density, pcf: | 186 | 185 |
| Linear Change in Burning to Cone 11: | +0.1 | +0.2 |
| Bulk Density | | |
| Cured at 600° F.: | 177 | 178 |
| Burned, Cone 11: | 175 | 173 |
| Apparent Porosity | | |
| Cured at 600° F.: | 16.1 | 16.6 |
| Burned, Cone 11: | 15.8 | 16.0 |
| Apparent Specific Gravity | | |
| Cured at 600° F.: | 3.38 | 3.42 |
| Burned, Cone 11: | 3.33 | 3.30 |
| Modulus of Rupture | | |
| At Room Temperature | | |
| Cured at 600° F.: | 2910 | 2500 |
| Burned, Cone 11: | 3340 | 3590 |
| At 1500° F. | | |
| Cured at 600° F.: | 3460 | 3450 |
| Burned, Cone 11: | 4110 | 4260 |
| Linear Reheat Change, % | | |
| After Reheat at 1500° F. | | |
| Cured at 600° F.: | +0.1 | +0.1 |
| Burned, Cone 11: | 0.0 | 0.0 |
| After Reheat at 2550° F. | | |
| Cured at 600° F.: | +0.4 | +0.3 |
| Burned, Cone 11: | +0.2 | +0.2 |
| Mix Designation: | | |
| 72 Hour Alcoa Cup Test, 7025 Alloy Cured at 600° F. | | |
| % Change in Metal Chemistry | | |
| Si | +0.17 | +0.08 |
| Fe | +0.03 | +0.03 |
| Mg | −1.95 | −1.71 |
| Depth of Metal Penetration | up to 1 mm | trace |
| Degree of Metal Adherence | strong | strong |
| Burn, Cone 11 | | |
| % change in Metal Chemistry | | |
| Si | +0.20 | +0.06 |
| Fe | +0.05 | +0.03 |
| Mg | −2.37 | −1.99 |
| Depth of Metal Penetration | up to ¼ mm | up to ¼ mm |
| Degree of Metal Adherence | strong | strong |

It will be noted that it is only with the boron phosphate as compared to the other penetration inhibitors that one is able to get the improved resistance to aluminum penetration without any adverse effect on the hot strength or processing characteristics in making the brick.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A mix for forming a high alumina refractory shape with high resistance to aluminum penetration and high hot strength consisting essentially of at least 60% by weight aluminum oxide and 1% to 5% by weight boron phosphate and, for each 100 parts by weight of aluminum oxide and boron phosphate, $P_2O_5$ as phosphoric acid or monoaluminum phosphate in an amount sufficient to bind the mix.

2. The mix of claim 1 wherein there is present at least about 80% by weight aluminum oxide, from about 1% to 5% by weight of boron phosphate, and for each 100 parts by weight of aluminum oxide and boron phosphate from about 4% to 5% by weight $P_2O_5$ as phosphoric acid.

3. A high alumina refractory shape with high resistance to aluminum penetration consisting essentially of at least about 60% by weight aluminum oxide 1% to 5% by weight boron phosphate, said shape bonded by aluminum phosphate formed by phosphoric acid reacting with said aluminum oxide in the curing of the mix used to make said shape or by the addition of monoaluminum phosphate.

4. A cured refractory brick characterized by resistance to penetration and reaction with aluminum and having high hot strength consisting essentially of an aluminum oxide based material wherein there is present at least about 60% by weight aluminum oxide and 1% to 5% by weight boron phosphate, said brick bonded by aluminum phosphate formed by phosphoric acid reacting with said aluminum oxide in the curing of the mix used to form the brick or by the addition of monoaluminum phosphate.

5. The brick of claim 4 wherein the aluminum oxide based material is selected from calcined bauxite or a mixture of calcined bauxite and pure alumina powder.

6. The brick of claim 4 wherein the aluminum oxide based material is a mixture of at least about 75 parts of calcined bauxite and 15 parts of alumina there is from about 1% to 5% by weight of boron phosphate.

7. The brick of claim 4, including a ball clay and wherein there is at least about 80% by weight of aluminum oxide, from about 2.5% to 3.6% by weight of boron phosphate, and from about 4% to 5% by weight of $P_2O_5$ as phosphoric acid in the mix from which the brick is formed.

8. The brick of claim 5, including a ball clay and wherein there is at least about 80% by weight of aluminum oxide, from about 2.5% to 3.6% by weight of boron phosphate, and from about 4% to 5% by weight of $P_2O_5$ as phosphoric acid in the mix from which the brick is formed.

9. The brick of claim 6, including a ball clay and wherein there is at least about 80% by weight of aluminum oxide, from about 2.5% to 3.6% by weight of boron phosphate, and from about 4% to 5% by weight of $P_2O_5$ as phosphoric acid in the mix from which the brick is formed.

* * * * *